United States Patent
Connor

(10) Patent No.: US 6,721,835 B1
(45) Date of Patent: Apr. 13, 2004

(54) METHOD AND APPARATUS FOR MINIMIZING BUS CONTENTION FOR I/O CONTROLLER READ OPERATIONS

(75) Inventor: Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 09/663,953

(22) Filed: Sep. 19, 2000

(51) Int. Cl.$^7$ .............................................. G06F 12/00
(52) U.S. Cl. ...................................................... 710/240
(58) Field of Search ................................. 710/240–244, 710/52, 110, 268; 709/230, 234; 370/363

(56) References Cited

U.S. PATENT DOCUMENTS

| | | | | |
|---|---|---|---|---|
| 5,694,613 A | * | 12/1997 | Suzuki ........................ 712/231 |
| 5,797,041 A | * | 8/1998 | Yasue et al. .................. 710/52 |
| 5,854,908 A | * | 12/1998 | Ogilvie et al. ............... 710/312 |
| 5,923,852 A | * | 7/1999 | Lee et al. .................... 709/234 |
| 6,094,700 A | * | 7/2000 | Deschepper et al. ......... 710/313 |
| 6,173,349 B1 | * | 1/2001 | Qureshi et al. .............. 710/110 |
| 6,336,157 B1 | * | 1/2002 | Carbonaro et al. ........... 710/59 |
| 6,463,498 B1 | * | 10/2002 | Wakeley et al. ............. 710/309 |
| 2002/0009075 A1 | * | 1/2002 | Fesas .......................... 370/363 |

* cited by examiner

Primary Examiner—Sumati Lefkowitz
Assistant Examiner—Kim T. Huynh
(74) Attorney, Agent, or Firm—Blakely, Sokoloff, Taylor & Zafman LLP

(57) ABSTRACT

While a controller is reading a frame, a driver prepares one or more subsequent frames. A single inform write is sent by the driver to a command register of the controller to inform the controller of completion of preparation of the subsequent frame(s). By preparing the subsequent frame(s) during the reading of the frame and by collectively batching the inform writes of the prepared subsequent frames as the single inform write, instead of sending separate individual inform writes, the reading of frame(s) by the controller is uninterrupted and a number of times that the controller has to arbitrate for bus control is minimized. This advantageously reduces bus contention and latency.

28 Claims, 3 Drawing Sheets

METHOD AND APPARATUS FOR MINIMIZING BUS CONTENTION FOR I/O CONTROLLER READ OPERATIONS

BACKGROUND OF THE INVENTION

1. Field of the Invention

The present invention relates generally to data transfers in computer systems, and in particular, relates to improving data transfer and bus efficiency by minimizing bus contention when a device reads data from memory.

2. Background Information

In computer systems, components are coupled to each other via one or more busses. A variety of components can be coupled to the bus, thereby providing intercommunication between all of the various components/devices. An example of a bus that is used for data transfer with a processor or for data transfer between a memory and another device is the peripheral component interconnect (PCI) bus.

In order to relieve a processor of the burden of controlling the movement of blocks of data inside of a computer, direct memory access (DMA) transfers are commonly used. With DMA transfers, data can be transferred from one memory location to another memory location, or from a memory location to an input/output (I/O) device (and vice versa), without having to go through the processor. Additional bus efficiency is achieved by allowing some of the devices connected to the PCI bus to be DMA masters.

When transferring data using DMA methods, scatter gather descriptors are often used. High performance I/O controllers, such as gigabit Ethernet media access control (MAC) network controllers, are typically scatter gather descriptor-based bus-mastering devices that allow a computer to communicate with a network. The scatter gather descriptors are used to provide address and control information about data buffers (or "scatter gather elements") in memory that the controller needs to read or write for I/O operations. For example, the descriptors provide information such as the memory location from where bytes of data are to be moved, the address to where the bytes should go, the number of bytes to move, etc.

To read a data buffer of a memory using DMA transfers, such as when the data has to be retrieved from memory so that the data can be transmitted by the controller, a driver for the controller first prepares the data buffer. This preparation includes querying the data buffer to obtain the data buffer's physical address and length. This information and other control information are then placed by the driver into the descriptor(s). Next, the driver writes to a command register of the controller to inform the controller that the descriptor (s) are ready to be processed. The controller then DMA transfers the descriptor(s) from memory to a first-in-first-out (FIFO) buffer, for example, so that the controller can obtain the data buffer's information (e.g., identify the data buffer's memory location, length, etc.). After the controller has processed the descriptor(s) to obtain this information, the controller can, DMA transfer the contents/data (e.g., frames) in the data buffer referred to by the descriptor(s).

When the driver is given several frames to be transmitted in rapid succession, the writes to the command register to inform the controller of subsequent frame(s) can interfere with data that is currently being read (e.g., currently being DMA-transferred) for previous frames. For example, if the driver is given two frames to send, the driver initially prepares the first frame and writes to the controller's command register to inform the controller that the first frame is ready. Subsequently, the driver prepares the second frame and again writes to the controller's command register to inform the controller that the second frame is ready.

However, this second write to the command register may occur while the controller is attempting to read the data for the first frame. On many computer systems, such writes to the command register are generally slave accesses to the controller that are driven by a bridge. That is, the bridge must remove control of the bus from the controller each time the driver performs the write(s) to the command register. After the write occurs, the controller arbitrates again for control of the bus in order to resume reading the data of a frame. Thus, in the above-described example, the process of informing the controller about the second frame interfered with the reading of the data for the first frame.

In this example and in situations where protocols allow several frames of data to be available at once, the driver is often given multiple frames to send in rapid succession. The bus, contention associated with informing the controller of the frames and the resulting re-arbitration for the bus by the controller reduce the controller's bus efficiency and can cause performance penalties.

BRIEF DESCRIPTION OF THE DRAWINGS

Non-limiting and non-exhaustive embodiments of the present invention will be described in the following figures, wherein like reference numerals refer to like parts throughout the various views unless otherwise specified.

DETAILED DESCRIPTION OF THE ILLUSTRATED EMBODIMENTS

Embodiments of a method and apparatus to minimize bus contention when a device, such as a network controller, reads data from memory are described in detail herein. In the following description, numerous specific details are provided, such as the description of computer system components in FIG. 1, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a driver for a device, such as a network controller or I/O controller, which informs the controller when data in memory is ready to be read and output. This is done using what is hereinafter referred to as an "inform write" by the driver to a command register of the controller. Sequences or sets of data, such as frames or packets, are prepared while another frame is being DMA-transferred from memory by the controller via a bus, although other types of data transfer/reading methods other than DMA methods may be used. Inform writes are optimally batched to minimize the time to: send the inform writes as compared to sending them individually, the controller's re-arbitration for the bus, and interference with the DMA transfer of a previously sent frame. Such an embodiment can be used with systems that use protocols such as Transmission Control Protocol/Internet Protocol (TCP/IP) and Network Driver Interface Specification (NDIS), which support the sending of several frames to a driver at once.

Figure 1:
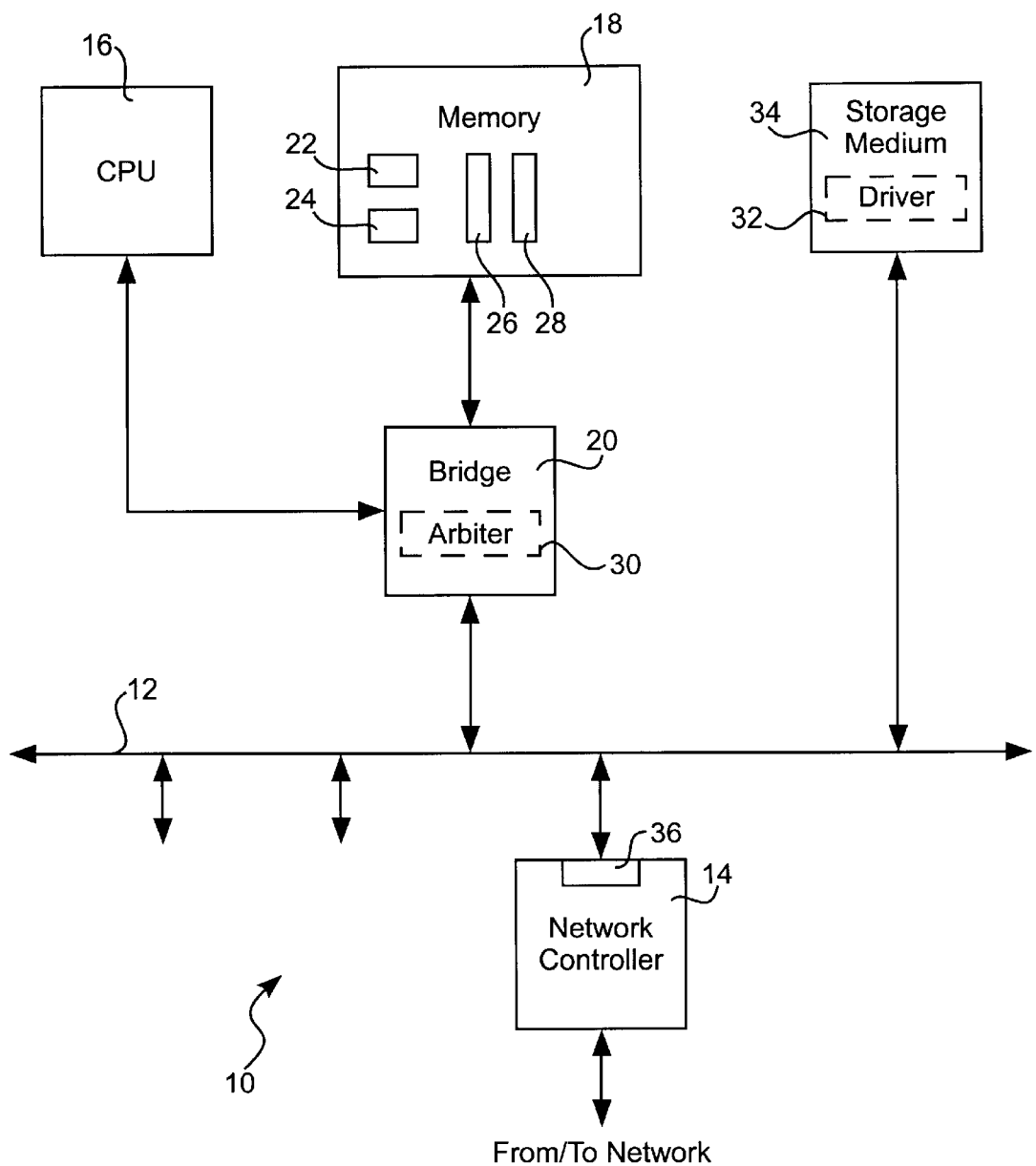
FIG. 1 is a block diagram of a system that can implement an embodiment of the invention.

Referring first to FIG. 1, shown generally at 10 is a system, such as a computer system, that can implement an embodiment of the invention. The system 10 can comprise an apparatus such as a personal computer (PC), laptop computer, network switch or router, wireless device, and the like having the capability to connect to a network (not shown). The system 10 includes a bus 12, which can be a PCI bus, for example. It is to be appreciated that other types of busses, such as a universal serial bus (USB) or InfiniBand, may also be used.

Several devices may be directly or indirectly coupled to the bus 12. For instance, an I/O controller or network controller 14 is coupled to the bus 12 and allows the system 10 to send/receive network data, typically in the form of packets or frames. In one embodiment, the controller 14 (sometimes referred to as an "adapter") can comprise an Ethernet MAC controller or network interface card (NIC), and it is understood that other types of network controllers, I/O controllers such as small computer system interface (SCSI) controllers, or cards may be used.

A processor 16, such as a central processing unit (CPU), and a memory 18 can be coupled to the bus 12 via a bridge 20. The memory 18, sometimes referred to as "host memory" or "system memory," typically comprises random access memory (RAM). The memory 18 can further include a plurality of data buffers 22 and 24 and can store a plurality of descriptors 26 and 28, for example. The descriptors 26 and 28 may or may not be contiguously connected as "descriptor rings." Although FIG. 1 shows the data buffers 22 and 24 and the descriptors 26 and 28 as residing in the memory 18, it is to be appreciated that some or all of these buffers/descriptors may be located in a storage unit separate from the memory 18 in one embodiment.

To provide arbitration for use of the bus 12 (e.g., when reading from or writing to the memory 18), the bridge 20 includes an arbiter 30. A driver 32 controls operation of the network controller 14 and performs other operations related to the reading of frames from the memory 18. The driver 32 is typically embodied in software that is stored in a machine-readable storage medium 34, such as a hard disk drive of the system 10, and is executed by the processor 16. As is known in the art, execution of the software of the driver 32, during normal operation, can include copying this software into the memory 18 and/or into a cache (not shown) of the processor 16, and execution of the software from that location.

According to an embodiment of a method that will be described below, the driver 32 prepares one or more frames, including preparation of descriptors 26 and 28 associated with these frames, during and within a time period when another frame is currently being DMA-transferred by the controller 14 from the data buffer(s) 22 or 24. Inform writes for the subsequent frames, to indicate completion of preparation of the frames, are sent as a batch by the driver 32 to a command register 36 of the controller 14, after completing the DMA transfer of a previous frame in one embodiment.

Figures 2, 3, 4:
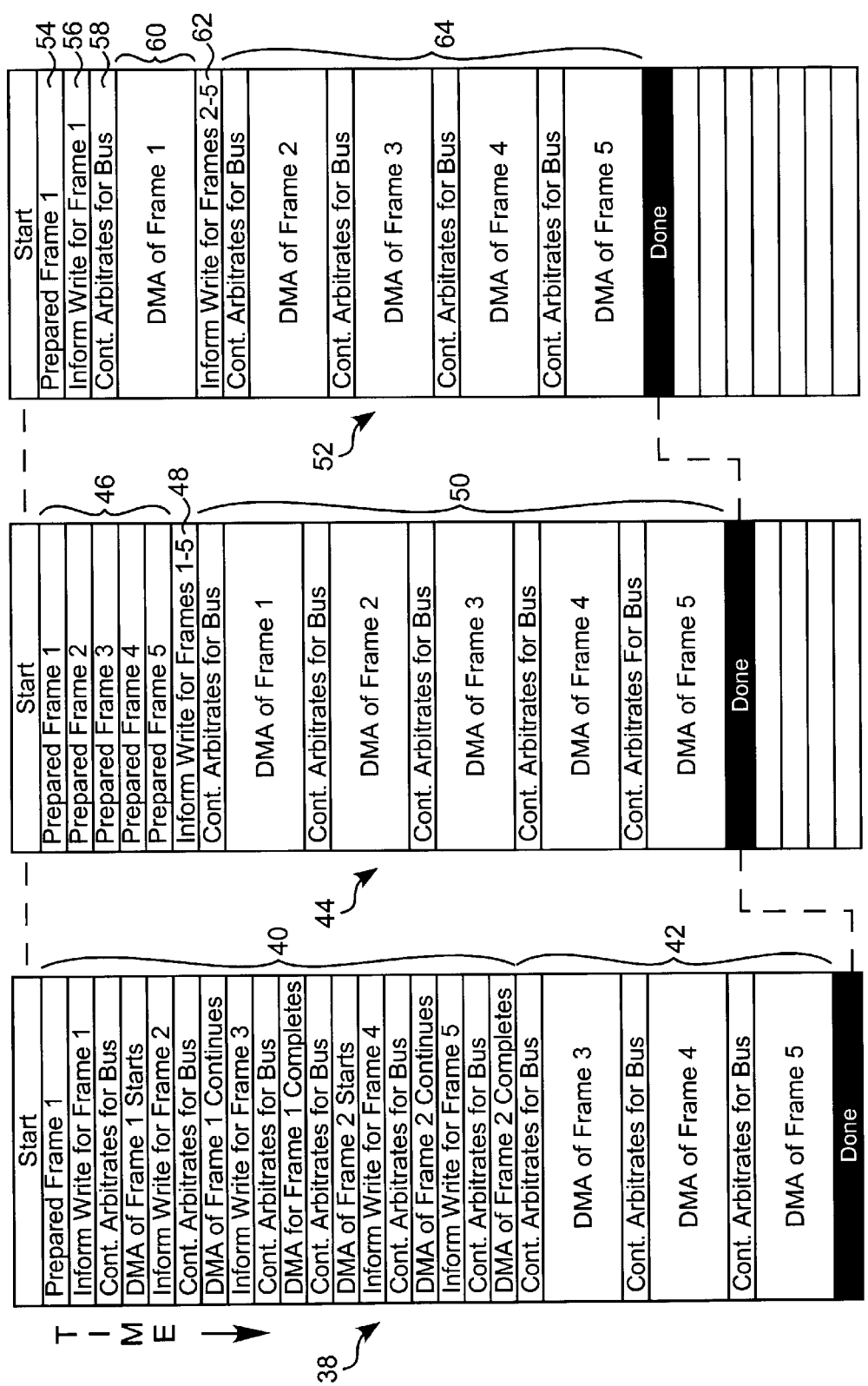
FIG. 2 illustrates a known method of reading data by a network controller.
FIG. 3 illustrates an embodiment of a method of reading data by a network controller.
FIG. 4 illustrates a method of reading data that can be used by the system of FIG. 1 according to an embodiment of the invention.

An embodiment of the invention and how it compares to prior art are illustrated in FIGS. 2–4. In the examples of FIGS. 2–4, events are represented in timeline tables and are shown from a perspective of a bus. For clarity of explanation and illustration, non-bus events, such as preparation of a frame, are also shown when they are not done in parallel with bus events, such as bus arbitration or DMA transfers. In other words, these non-bus events are only shown when they delay bus events and add latency to the I/O or read operations. Also, for the sake of illustration and explanation in FIGS. 24, each frame is shown as using three time units to complete DMA transfer, with frame preparation, inform writes, controller arbitration, etc. being shown as using one time unit.

FIG. 2 represents a timeline table 38 of a prior art method of reading frames from memory. The timeline table 38 illustrates events such as the preparation of, inform writes for, and DMA transfer of five frames, with five frames being arbitrarily chosen as an example. The timeline table 38 is similar to the situation discussed in the Background section above for two frames. As shown at 40, the DMA transfer for Frame 1 is interrupted by inform writes for subsequent Frames 2 and 3. Furthermore, latency to the DMA transfer of Frame 1 occurs because the controller has to arbitrate for the bus after each inform write. Similar interruptions and latencies occur for the DMA transfer of Frame 2, as also shown at 40. At 42, all of the inform writes have been completed, and the remaining Frames 3–5 are DMA-transferred.

FIG. 3 represents a timeline table 44 of an embodiment of an inform write batching; method that attempts to improve on the prior art method shown in FIG. 2. In the timeline table 44, Frames 1–5 are all prepared first at 46, and then, their corresponding inform writes are batched together as a single message and sent to the controller 14 at 48. At 50, Frames 1–5 are DMA-transferred. A disadvantage of the method of FIG. 3 is that Frame 1 (as well as subsequent frames) must suffer the latency of waiting to be DMA-transferred until all frames are prepared.

A timeline table 52 of FIG. 4 illustrates an embodiment of a method that provides improvements over the methods shown in FIGS. 2 and 3. A feature of the embodiment shown in FIG. 4 is that the driver 32 informs the controller 14 of pending frame(s) with inform writes to the relevant command register 36 in such a manner that the DMA transfer of a frame is not subjected to the latency of preparation time for subsequent frames by the driver 32 (e.g., as in FIG. 3) and that inform writes to inform the controller 14 of subsequent frames do not interfere with the DMA transfer of the current frame (e.g., as in FIG. 2).

Specifically in FIG. 4, Frame 1 is prepared by the driver 32 at 54, and a corresponding inform write to the command register 36 occurs subsequently at 56. The controller 14 arbitrates for the bus 12 at 58, and DMA transfer of Frame 1 occurs at 60. While the DMA transfer of Frame 1 is occurring at 60, while the controller is arbitrating for the bus 12 at 58, or both, the driver 32 prepares the subsequent Frames 2–5. Consequently; after the DMA transfer of Frame 1 is completed, a single inform write can be performed by the driver 32 at 62, as a single message. Thereafter, Frames 2–5 are DMA-transferred at 64.

While Frames 2–5 are being DMA-transferred, frames subsequent to these frames can be prepared by the driver 32, so that the described method can repeat, using subsequent batched inform writes. By preparing subsequent frames during the DMA transfer of a current frame(s) and by batching inform writes of subsequent frames, it is clear from the timeline table 52 that bus efficiency is improved and that latency is reduced.

In the embodiment shown in FIG. 4, Frames 2–5 are prepared and preparation is completed within a time period to DMA transfer Frame 1. As mentioned, this preparation of Frames 2–5 may include preparation during bus arbitration by the controller 14. In another embodiment, preparation and substantial completion of preparation of Frames 2–5 may occur within the time period to DMA transfer Frame 1, but total completion may occur shortly after completion of the DMA transfer. In such a case, the number of frames to prepare may be optimally chosen so that the latency time (e.g., the time difference) between the end of the DMA transfer of Frame 1 and the completion of the preparation of Frames 2–5 thereafter is minimized.

According to one embodiment, the inform writes for subsequent frames occur immediately after the DMA transfer of a prior frame completes and after the arbiter 30 has caused the controller 14 to relinquish control of the bus 12. This ensures that the inform writes at 12 do not interfere with the prior frame's DMA activity, such as shown at 40 in FIG. 2. Additionally, the number of subsequent frames to prepare is optimally chosen so that the time for frame preparation will completely overlap with the DMA transfer of one or more current frames. Stated in another way, the driver 32, in one embodiment, can limit the number of subsequent frames that are prepared so that frame preparation time is ensured to less than or equal to the DMA transfer time of one or more current frames.

In another embodiment, the inform writes by the driver 32 at 62 can occur after substantial completion of a DMA transfer of a frame, instead of after total completion of the DMA transfer for Frame 1 at 60, for example. That is, in embodiments of the system 10 where the arbiter 30 allows the controller 14 to finish a DMA transfer once it is started, the inform writes at 62 are held in abeyance in a buffer (not shown) of the bridge 20 by the arbiter 30 until after the controller 14 relinquishes control of the bus 12 (e.g., sometime after completing the DMA transfer of a frame).

When determining the number of frames to prepare at once, several factors can be considered: the time required by the controller 14 to arbitrate for the bus 12, the time required to DMA transfer a frame, the number of frames currently queued by hardware of the system 10, and the time required to prepare a frame. Another possible factor is the maximum array size of prepared frame information (e.g., the number of descriptors) that an operating system of the system 10 allows. These values are often application or implementation specific, and can be determined by those skilled in the art based on the description herein. For instance, the time to prepare a frame and the time to DMA transfer a frame are often dependent on the processor 16. The faster the processor 16, the faster the frame preparation becomes. Also, the faster the bus 12, the faster DMA transfer occurs. In systems 10 where one or more of these values may be indeterminate, mean values may be used by one embodiment.

Figure 5:
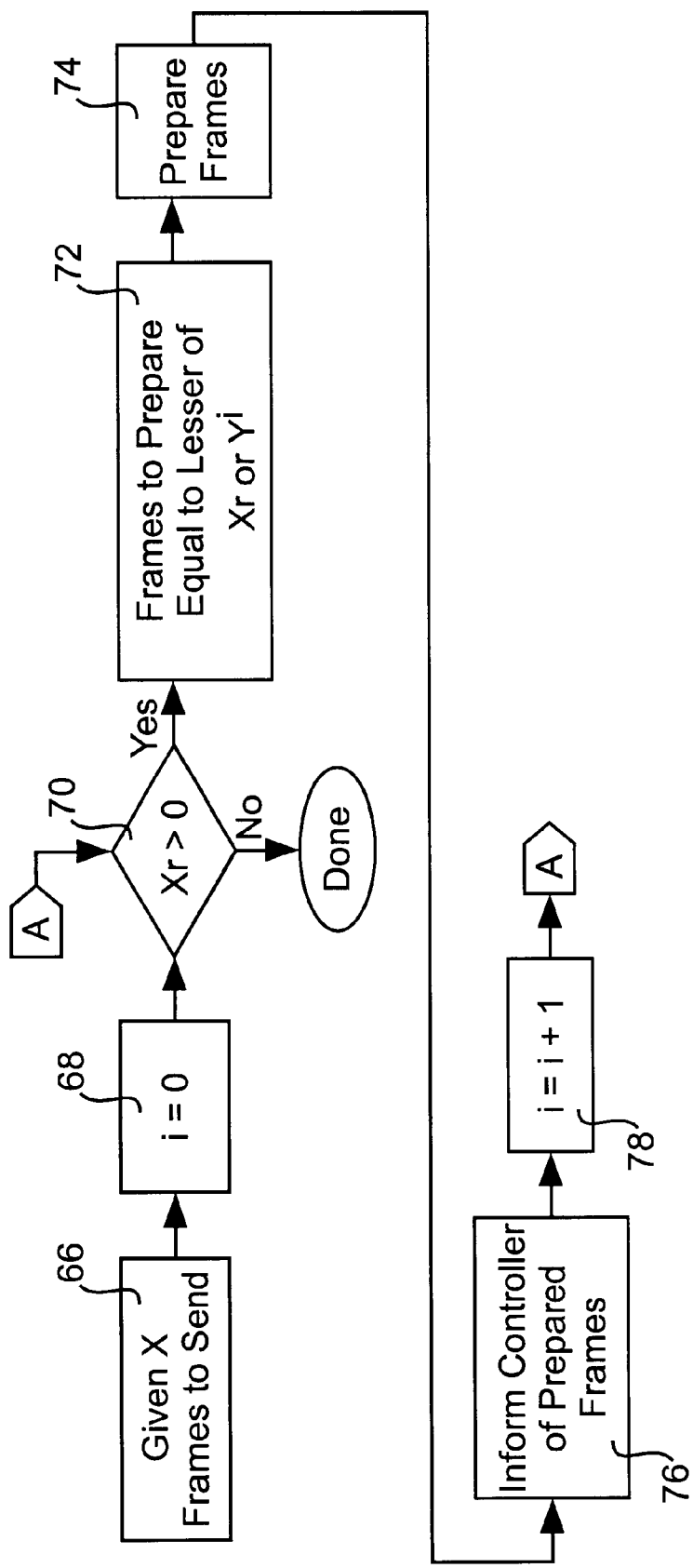
FIG. 5 is a flowchart of an algorithm that further illustrates the embodiment of the method shown in FIG. 4.

FIG. 5 shows an embodiment of a general algorithm that further illustrates the method shown in FIG. 4. In the algorithm of FIG. 5, the following factors are used:

i=count of the number of inform writes to send to the controller 14

X=total number of frames to send to the controller 14

Xr=number of frames remaining to be processed by the driver 32

Y=number of frames that can be prepared while one frame is DMA-transferred to the controller 14.

If X=10 frames to send at 66 and Y=3 frames that can be prepared while one frame is DMA-transferred, then an initial value of i is zero at 68 and an initial value of Xr is 10 (e.g., no frames prepared yet) at 70. Thus, since Xr is greater than zero at 70, the number of frames to prepare at 72 is equal to the lesser of Xr=10 or $Y^1=3^0=1$. As a result, one frame is prepared at 74, and the controller 14 is informed of one prepared frame at 76. At 78, i is incremented by 1, so that i=1. DMA transfer of the one prepared frame may occur at this point.

Returning to 70, via A, Xr=9, since one of the ten frames has already been prepared. At 72, $Y^i$ has a value of 3, which is less than the value 9 of Xr. Hence, three frames are prepared at 74, which occur while the first frame is being DMA-transferred. The controller 14 is informed of the three frames at 76, and i is incremented at 78 to a value of 2.

Returning to 70, Xr now has a value of 6. At 72, it is determined as a result that six frames need to be prepared, since $Y^1$ now has a value of 9. The process described above repeats at 74–78, and when the algorithm returns to 70, Xr has a value of zero, ending the algorithm/frame preparation.

In conclusion, an embodiment of the invention provides a method where frames do not incur latency due to subsequent frames' preparation time. Furthermore, inform writes are optimally batched so as not to further add latency. This embodiment results in high bus efficiency because DMA transfers are started as soon as possible and are interfered with as little as possible.

Not only does an embodiment of the invention provide improvements over the methods shown in FIGS. 2 and 3, but advantages are also provided over polling methods. With polling, a driver does not explicitly inform a controller of data that is ready to be read. Instead, the controller periodically reads a predetermined memory location to see if any frames are ready. This allows the controller to "look" for pending frames only when it is not actively processing the current frame. Polling has a drawback in that if the polling frequency is too high, then bus bandwidth can be "stolen" from other devices connected to the bus. However, if the polling frequency is too low, then frames can incur latency by having to wait for the controller to check if these frames are ready.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:

reading a first frame of data;

preparing a plurality of second frames of data within a portion of a time period of the reading of the first frame of data; and informing of a completion of preparation of the plurality of second frames of data as a single message subsequent to substantial completion of the reading of the first frame of data and without interruption of the reading of the first frame of data wherein the single message identifies at least two of the plurality of second frames.

2. The method of claim 1 wherein preparing the plurality of second frames of data comprises completing descriptor information corresponding to the second frames of data.

3. The method of claim 1 wherein preparing the plurality of second frames of data includes preparing a portion of the plurality of second frames during a time period to inform completion of the first frame of data.

4. The method of claim 1 wherein preparing the plurality of second frames of data includes preparing a portion of the plurality of second frames during a time period to arbitrate for bus control to read the first frame of data.

5. The method of claim 1 wherein reading the first frame of data comprises using a direct memory access transfer.

6. The method of claim 1, further comprising, subsequent to informing of the completion of the preparation of the plurality of second frames of data, reading each of the second frames of data.

7. The method of claim 6, further comprising preparing a plurality of third frames of data within a time period to read at least one of the plurality of second frames of data.

8. A method, comprising;

reading a first set of data;

preparing at least one second set of data within a portion of a time period of the reading of the first set of data;

informing completion of preparation of the at least one second set of data in a single message subsequent to substantial completion of the reading of the first set of data and without interruption of the reading of the first set of data, wherein the single message identifies the at least one second set of data.

9. The method of claim 8 wherein the first set of data and the at least one second set of data comprise frames.

10. The method of claim 8, further comprising:

preparing additional sets of data in addition to the at least one second set of data; and collectively informing of completion of preparation of the additional sets of data and of the at least one second set of data in the single message.

11. The method of claim 8 wherein the portion of time associated with the reading of the first set of data includes a portion of time to direct memory access transfer the first set of data.

12. The method of claim 8 wherein the portion of time associated with the reading of the first set of data includes time to inform completion of preparation of the first set of data or time to arbitrate for bus control to read the first set of data.

13. The method of claim 8, further comprising:

reading the at least one second set of data; and preparing additional sets of data within a portion of time associated with the reading of the at least one second set of data.

14. The method of claim 13, further comprising:

informing completion of preparation of the additional sets of data subsequent to substantial completion of the reading of the at least one second set of data; and subsequently reading the additional sets of data until completion of a reading of a predetermined number of prepared sets of data.

15. The method of claim 8 wherein at least one of a time to arbitrate for bus control to read one of the sets of data, time to read one of the sets of data, time to prepare one of the sets of data, number of queued sets of data, or maximum number of sets of data for which the single message is capable of informing of completion comprises a mean value.

16. A machine-readable medium having stored thereon instructions, which if executed by a processor, cause the processor to effect the following, comprising:

read a first set of data;

prepare at least one second set of data within a portion of time associated with the read of the first set of data; and inform completion of preparation of at least one second set of data in a single message subsequent to substantial completion of the read of the first set of data and without interruption of the read of the first set of data, wherein the single message identifies the at least one second set of data.

17. The machine-readable medium of claim 16 wherein the instructions further cause the processor to effect the following, comprising:

prepare additional sets of data in addition to the at least one second set of data; and collectively inform of completion of preparation of the additional sets of data and of the at least one second set of data as the single message.

18. The machine-readable medium of claim 16 wherein the instructions further cause the processor to effect the following, comprising:

read the at least one second set of data;

prepare additional sets of data within a portion of time associated with the read of the at least one second set of data.

19. The machine-readable medium of claim 18 wherein the instructions further cause the processor to effect the following, comprising:

prepare a portion of the at least one second set of data during a time period to arbitrate for bus control to read the first set of data.

20. An apparatus, comprising:

a controller to read a first set of data; and a driver for the controller to prepare at least one second set of data within a portion of time associated with a the read of the first set of data by the controller, the driver being capable to inform the controller of completion of preparation of the at least one second set of data in a single message subsequent to substantial completion of the read of the first set of data by the controller and without interruption of the read of the first set of data, wherein the single message identifies the at least one second set of data.

21. The apparatus of claim 20, further comprising a register in the controller to receive the message from the driver to collectively inform the controller of completion of preparation of the at least one second set of data and of at least another set of data.

22. The apparatus of claim 20 wherein the driver is capable to insert information into a descriptor corresponding to the at least one second set of data as part of the preparation of the at least one second set of data.

23. The apparatus of claim 20 wherein the controller is capable to read the first set of data with a direct memory access transfer.

24. A system, comprising:
   a storage unit to store sets of data;
   a controller to read a first set of data of the storage unit; and
   a driver for the controller to prepare at least one second set of data within a portion of time associated with the read of the first set of data by the controller, the driver being capable to inform the controller of completion of preparation of the at least one second set of data in a single message subsequent to substantial completion of the read of the first set of data by the controller and without interruption of the read of the first set of data, wherein the single message identifies the at least one second set of data.

25. The system of claim 24, further comprising a register in the controller to receive the message from the driver to collectively inform the controller of completion of preparation of the at least one second set of data and of at least another set of data.

26. The system of claim 24, further comprising a bus coupled between the storage unit and the controller to carry sets of data read by the controller and information from the driver to inform the controller of completion of preparation of the at least one second set of data.

27. The system of claim 24, further comprising a processor coupled to the storage unit to control operation of the driver.

28. The system of claim 24 wherein at least one of a time to arbitrate for bus control to read one of the sets of data by the controller, time to read one of the sets of data by the controller, time to prepare one of the sets of data by the driver, number of queued sets of data, or maximum number of sets of data for which the single message is capable of informing of completion comprises a mean value.

* * * * *

UNITED STATES PATENT AND TRADEMARK OFFICE
CERTIFICATE OF CORRECTION

PATENT NO. : 6,721,835 B1
DATED : April 13, 2004
INVENTOR(S) : Connor

It is certified that error appears in the above-identified patent and that said Letters Patent is hereby corrected as shown below:

<u>Column 4,</u>
Line 67, delete ":" and insert -- , --.

<u>Column 6,</u>
Line 13, delete "$Y^1 = 3^0 = 1$" and insert -- $Y^i = 3^0 = 1$ --.
Line 26, delete "$Y^1$" and insert -- $Y^i$ --.

<u>Column 8,</u>
Line 52, delete "a" after the word "with".

<u>Column 9,</u>
Line 8, delete "of" and insert -- from --.

Signed and Sealed this

Thirty-first Day of August, 2004

JON W. DUDAS
*Director of the United States Patent and Trademark Office*